Oct. 3, 1961     V. H. GARBRICK     3,002,753
FOLDABLE AND PORTABLE FERRIS WHEEL
Filed Nov. 23, 1960     2 Sheets-Sheet 1

INVENTOR
VERNON H. GARBRICK
BY
ATTORNEY

Oct. 3, 1961 V. H. GARBRICK 3,002,753
FOLDABLE AND PORTABLE FERRIS WHEEL
Filed Nov. 23, 1960 2 Sheets-Sheet 2
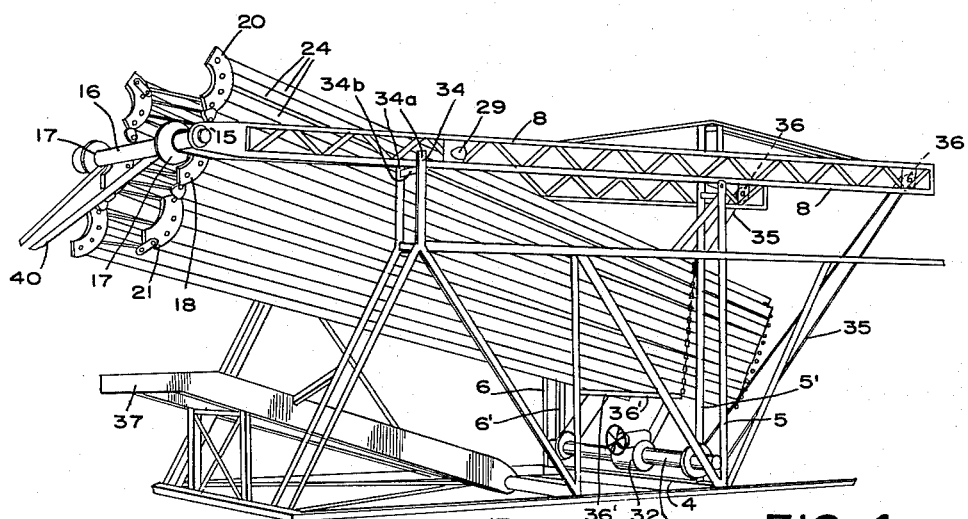
FIG. 4
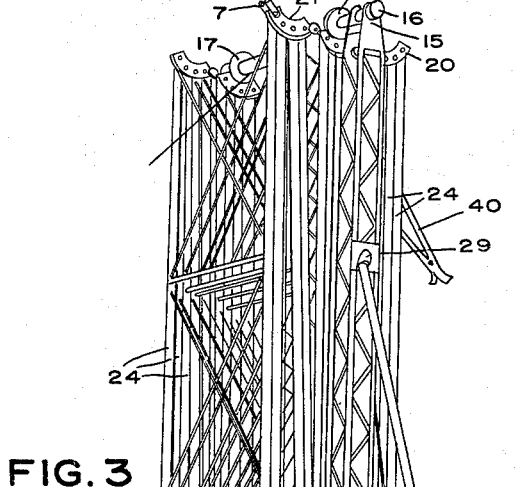
FIG. 3
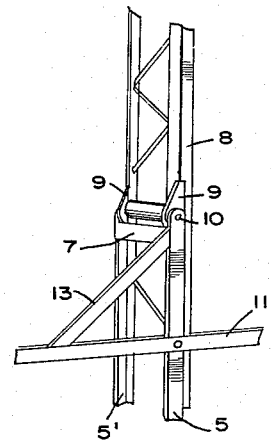
FIG. 6
INVENTOR
VERNON H. GARBRICK
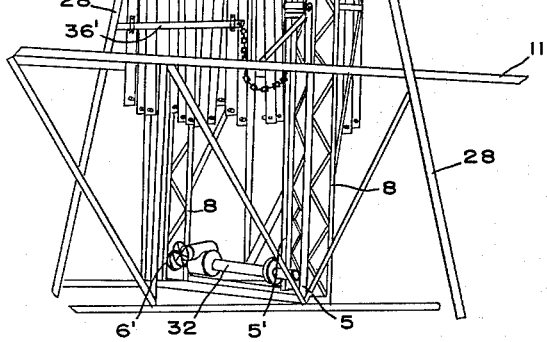
BY
ATTORNEY

United States Patent Office 3,002,753
Patented Oct. 3, 1961

3,002,753
FOLDABLE AND PORTABLE FERRIS WHEEL
Vernon H. Garbrick, 375 Pennsylvania Ave.,
Centre Hall, Pa.
Filed Nov. 23, 1960, Ser. No. 71,193
18 Claims. (Cl. 272—29)

This invention relates to a foldable and portable Ferris wheel.

An amusement device such as a roundabout or Ferris wheel is of necessity a structure of large proportions comprised of relatively heavy components, so as to support the weight of a large number of persons. Where however, it is desired to transport such a wheel from one location to another to be used at various fairs and carnivals, the problem arises of disassembling it at the first location and reassembling it at a second location, since it is obvious that a device of such large proportions cannot be safely moved great distances through crowded areas or stored in a relatively small space.

In accordance with my invention, I have therefore constructed a Ferris wheel which is easily and speedily disassembled and reassembled without the expenditure of an excessive amount of manpower and time, which can be gathered into a small and compact package for storage in a small space and easily transported through crowded areas.

It is therefore an object of my invention to provide a Ferris wheel of strong and rigid construction which may be readily dismantled when desired.

It is another object of my invention to provide a Ferris wheel which can be so dismantled, that the parts thereof remain in relatively orderly position, so that it may be readily reassembled.

A further object of my invention is to provide a Ferris wheel which can be easily and speedily collapsed when desired, into a compact package for purposes of transportation and storage.

A still further object of my invention is to provide a collapsible Ferris wheel mounted on a mobile base, so constructed as to also support the collapsed wheel in a rigid manner while being transported and for further supporting mechanism thereon for aiding the assembly and disassembly of the wheel.

With the above and other objects in view, the invention will now be described with special reference to the accompanying drawing in which:

FIG. 3 is a side elevation of the wheel in completely folded condition but in upright position on its mobile base;

FIG. 4 is a view partly in elevation of the wheel completely folded and supported on its mobile base;

FIG. 6 is a view in perspective of a detail of the invention.

Figures 1, 2, 5:
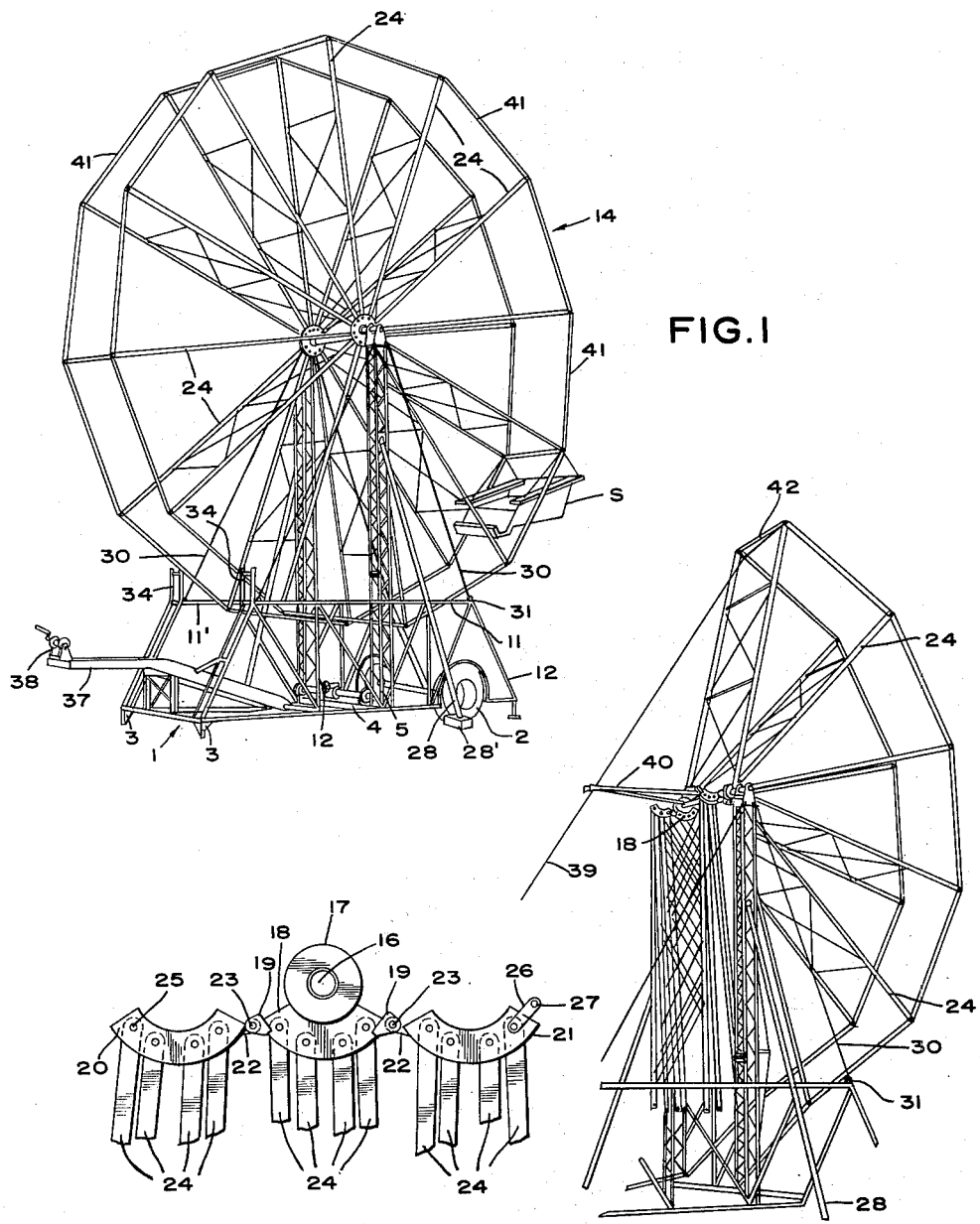
FIG. 1 is a perspective view of the Ferris wheel in fully assembled position mounted on a mobile base.
FIG. 2 is a perspective view of the upper portion of the wheel in partly folded condition.
FIG. 5 is an enlarged end view of the foldable spoke supporting hub assembly of the invention.

The portable Ferris wheel is shown in fully assembled relation in FIG. 1 with only one of the seating means S attached thereto, as an example. The base 1 supports the wheel in both the fully assembled and collapsed positions as explained hereinafter. The base consists of a lower rectangular frame of rigid metal bars or channel members suitably braced and supported on wheels 2 adjacent its rear end. The front end may have a pair of legs 3 for resting on the ground when the roundabout is in use or the front end may also be provided with wheels, if so desired. The mobile support is utilized as a trailer on which the Ferris wheel is supported in disassembled relation when being transported and as a supporting base therefor when in operation.

Extending across the lower frame of the mobile support and intermediate the ends thereof, is a rigid metal girder 4 secured at its ends either by welding or otherwise, to the side bars constituting the frame. A pair of parallel uprights 5, 5' laterally spaced from each other, are supported at their lower ends on the girder 4 adjacent one side of the frame and connected together by a bar 7. A second pair of laterally spaced like uprights 6, 6' parallel to each other, are supported at their lower ends adjacent to the opposite side of the frame on the girder 4 and likewise connected by a bar adjacent their upper ends, not shown. The upright members 5, 5', 6 and 6' are arrayed in alignment and are provided at their upper ends with transverse openings, all of which are in alignment.

A column 8, shown as latticed only by way of example, is pivotally mounted intermediate its ends between each pair of uprights 5, 5' and 6, 6' adjacent their upper ends. For this purpose, each of the columns 8 has a pair of ears 9 welded thereto intermediate its ends, the ears having aligned openings registering with the openings in the uprights, a pin 10 extending through the aligned openings in the ears and uprights 5, 5', 6, 6' for pivotally supporting each of the columns on its respective pair of uprights. In order to rigidify and further support the uprights, they are secured intermediate their ends to respective pairs of bars 11, 11' as by welding. Each pair of bars extends parallel to and above a respective one of the side frame members of the mobile base and is supported thereon by struts 12. The uprights may be further rigidified by a strut 13 secured to and extending between the upper end of each of the uprights and a respective bar 11, 11', only one such strut being shown in the drawings.

The roundabout or Ferris wheel generally designated as 14, is supported for rotation about an axis extending through aligned openings 15 in the upper ends of columns 8. Extending through the openings 15 in the spaced columns 8, is a shaft 16 which concentrically supports the spaced inner circular hub member 17 located between the two columns. In the conventional roundabout or Ferris wheel, the inner ends of the radially extending spokes are directly connected to a center hub and the points of connection thereto have a fixed arcuate spacing between them about the hub axis. In such an arrangement it would be necessary to remove the spokes entirely from the hub in disassembling the wheel if it were desired to transport the latter. Since there are usually two hubs and two sets of spokes it can readily be seen that disassembling the wheel for purposes of transportation and then reassembling it would be difficult.

To overcome this difficulty, the invention provides a sectionalized outer hub assembly having one arcuate section 18 secured to the inner hub 17, as by welding or in any other well known manner, and rotatable therewith. The section 18 forms one section of the cylindrical outer hub assembly and is provided at its ends with projecting ears 19 having axially extending openings therethrough. A further pair of arcuate sections 20 and 21 having ears 22 projecting toward each other, are pivotally mounted on the respective ears 19, of the fixed section 18 of the hub assembly by means of pins 23. Pivotally mounted on each of the outer hub sections 18, 20 and 21 by pivot pins 25 are the inner ends of the double spokes 24. Mounted on one of the arcuate sections such as 21, at the end opposite to that from which the ear projects, is a strap member 26 having an opening 27 at its outer end, for attachment to the section 20 when both arcuate sections 20 and 21 are positioned about the inner hub 17. The pivot pin 25 for the spoke 24 attached to section 20 at the extreme left, as shown in FIG. 5, may be hollow to permit the insertion of a locking bolt therethrough, which bolt also passes through opening 27 in the strap when the sections are assembled about the inner hub 17. The radius of curvature of the concavities in sections 20 and 21 is equal to that of the inner hub member 17, and the arcuate lengths of the three sections may be made substantially equal, if so desired. When assembled about shaft 16, the sections form a cylinder having an inner diameter substantially equal to that of the shaft. While only one outer hub assembly has been described, it is understood that the other outer hub assembly for supporting the other spoke of the double spoke assembly at the opposite end of the shaft 16, is of the same construction.

FIG. 3 shows the sections 20 and 21 of the outer hub assembly detached from the inner hub 17 with the spokes 24 depending vertically from the sections 18, 20 and 21. The columns 8 are shown in this figure in upright position and so maintained by a removable brace 28 having its upper end extending into a socket-like member 29 having a downwardly facing opening and secured to the side of each column 8. The lower end of each brace is fixed to a block 28' supported on the ground. The columns 8 are further braced in their upright position by cables 30 respectively fastened at one end to the upper end of each column and at the other end to eye members 31 secured to the upper bars 11 and 11' adjacent to their ends. When the braces 28 and cables 30 are removed, the columns may be rotated about the pivots 10 until each of them rests on a respective support member 34 mounted on each of the upper bars 11, 11'. As shown in FIG. 4, these support members each consist of a pair of laterally spaced upright bars 34a seated respectively on the longitudinally extending bars 11, 11' on each side of the frame. A rigid cradle bar 34b extends between and is secured to the uprights 34a below their upper ends to provide a cradle support for the columns 8 when they are lowered thereon. A winch 32 having a shaft 33 is mounted on the girder 4. A winch cable 35 is trained over a small pulley such as 36 mounted adjacent the lower end of each column 8, and is fixed at one end to the base. By operating the winch 32 the columns 8 are permitted by cable 35 to hinge about their pivots 10 and thus be lowered gently onto their respective supports 34 on bars 11 and 11' into substantially horizontal position as shown in FIG. 4. A sling 36' in the form of a bar suspended by cables or chains detachably secured at their upper ends to the uprights 5' and 6', supports the spokes 24 in stacked formation. In this position of the columns and spokes, the disassembled Ferris wheel is ready to be transported on its mobile base 1.

In assembling the Ferris wheel from its position shown in FIG. 4 to its fully developed form shown in FIG. 1, the winch cables 35 are operated to swing the lower ends of the columns downwardly until the columns are in upright position and against the shaft 33 and girder 4. As the columns 8 and stack of spokes 24 approach their vertical position, the sling 36' is removed by detaching the chains from the girders 5' and 6'. When in vertical position, the ends of cables 30, which had previously been attached to the upper ends of the columns, are securely fastened to the eyes 30. The upper ends of braces 28 are inserted in the sockets 29 and their supporting blocks 28' fixed against movement along the ground. A cantilever support 37 affixed at its rear end to the mobile frame 1, carries at its forward end a winch 38 for operating a cable 39. The cable 39 passes through an opening in the radially outward end of an angular bracket 40 having its arms attached at their ends to the shaft 16. The winch 38 and cable 39 are utilized in assembling and disassembling the wheel, as hereinafter described. In the position of the parts shown in FIG. 3, the sections 20 and 21 of the hub assembly extend horizontally from the fixed action.

A rigid rod or brace member 42 is temporarily connected to span the free ends of the outer double spoke 24 at the right side of the stack shown in FIG. 4. The cable 39 is then connected to rod 42 and the winch operated to swing the outer spokes of the stack counterclockwise, as shown in this figure, until they are sufficiently distant from the next spoke in the stack. Rail members 41 are then rigidly connected as by bolts, between the free ends of the outermost double spoke of the stack and the next spoke in the stack. The rail members 41 form the outer periphery of the wheel. It should be noted that the bracket 40 is secured at such a radial position on shaft 16, that it projects to the right of the shaft when the columns and the stack of spokes are in the vertical position of FIG. 3, thus enabling the cable 39 to swing the outermost spoke of the stack counterclockwise upon operation of the winch. After the first rail has been connected to the first two spokes in each stack, the cable is operated to swing them counterclockwise for a short distance. Then a rail is connected between the second and third spokes. Due to the rigid connection of the rail member 41 to the spokes, the section of the outer hub 21 on which the rail connected spokes are pivoted, begins to move counterclockwise about its pivot axis 23. Upon continued movement of the assembled spokes and rails in the counterclockwise direction, the section 21 becomes seated on the inner hub 17 as shown in FIG. 2. Further movement after such seating, results in rotating the inner hub 17 and as the rails 41 are connected in succession between adjacent spokes, the other outer hub section 20 will gradually move relatively clockwise about its pivot 23 to fold about the inner hub until its concave surface is in engagement with the periphery of the inner hub 17. The three sections 18, 20 and 21 then completely encircle the inner hub 17 in fully assembled relation and are so maintained by a lock bolt inserted in opening 27 and through the hollow pin in section 20 which pivotally supports the end spoke, as shown to the left in FIG. 5.

In disassembling the Ferris wheel of the invention, the same procedure as described in the assembly operation, but in reverse, may be followed. That is, with the wheel positioned so that the fixed section 18 is uppermost, the lock bolt is removed from the opening 27. The rails 41 connecting the two spokes adjacent to the free ends of sections 20 and 21 are removed and the wheel turned step-by-step to remove the rails as they reach the lowermost position. While the steps of assembling and disassembling the device have been indicated, it is obvious that with the above described structure of the sectionalized hub assembly and the winches mounted on the platform, other procedures may be followed as will occur to one skilled in the art.

Having thus described the invention, what is claimed is:

1. In a roundabout, a support, a shaft mounted on the support for rotation about its axis, a wheel hub assembly mounted on the shaft for rotation therewith, said assembly comprising a plurality of separate hub sections cooperating to surround the shaft, means supporting at least one of said sections on the shaft for pivotal movement about an axis parallel to and radially spaced from the axis of the shaft, and wheel spokes mounted at one end on the hub sections.

2. In a roundabout as defined in claim 1 and including means for detachably securing the hub sections together for maintaining them about the shaft.

3. In a roundabout as defined in claim 1 in which the wheel spokes are pivotally mounted on the hub sections about axes parallel to the shaft.

4. In a roundabout, a support, a shaft mounted on the support for rotation about its axis, a wheel hub assembly mounted on the shaft for rotation therewith and including a plurality of hub sections mounted on the shaft for pivotal movement about axes parallel to and radially spaced from the shaft axis, wheel spokes pivotally connected at one end to the hub sections and means for detachably connecting together the hub sections in assembled relation about the shaft.

5. In a roundabout, a support, a shaft mounted on the support for rotation about its axis, a wheel hub assembly mounted on the shaft for rotation therewith and comprising a plurality of hub sections detachably connected together at one end about the shaft and each pivoted at its other end on the shaft for movement about an axis parallel to and radially spaced from the shaft axis and wheel spokes pivotally mounted at one end to each of the hub sections.

6. In a roundabout, a support, a shaft mounted on the support for rotation about its axis, a segmented wheel hub mounted on the shaft for rotation therewith, each of the segments having a surface conforming to the shape of a portion of the shaft periphery, means for hingedly mounting at least each of a pair of such segments at one end to the shaft for movement about an axis parallel to and radially displaced from the shaft axis, means for detachably connecting together the other ends of the segments when the said surfaces thereof are on the shaft periphery.

7. In a roundabout as defined in claim 6 in which the shaft is cylindrical in form.

8. In a roundabout, a support, a shaft mounted on the support for rotation about its axis, a segmented wheel hub mounted on the shaft comprising a plurality of segments having surfaces conforming to the shape of the shaft periphery, one of said segments being fixed to said shaft, a second of said segments pivoted at one end to one end of the fixed segment, a third segment pivoted at one end to the other end of the fixed segment, the combined lengths of the surfaces of the segments being such as to substantially encompass the shaft when in engagement therewith.

9. In a roundabout, a support, a cylindrical shaft mounted on the support for rotation about its axis, a segmented wheel hub mounted on the shaft comprising a plurality of members having concave surfaces engageable with the periphery of the shaft to encircle it, a first of said members being secured to the shaft, means pivotally mounting one end of a second and third of said members to a respective end of the first member about an axis parallel to the shaft axis and a plurality of spokes pivotally mounted at one of their ends to said segments about axes parallel to the shaft.

10. In a roundabout, a support, a cylindrical shaft mounted on the support for rotation about its axis, a wheel hub assembly mounted on the shaft comprising at least three arcuate sections encircling said shaft, one of said sections being secured to the shaft, the sections adjacent the fixed section being pivotally mounted thereto about axes parallel to the shaft axis, means detachably connecting said sections together and spokes pivotally connected at one end to the arcuate sections about axes parallel to the shaft.

11. A Ferris wheel as defined in claim 10 whereby upon release of the detachable connection when the fixed section is at its lower position, the adjacent sections move to horizontal positions about their pivots with the spokes in vertically stacked relation, and a cable and winch mounted on the base, said cable being engageable with an outermost spoke of the stack to move it about its pivotal connection to a spaced position from an adjacent spoke to permit insertion of a rail therebetween.

12. A Ferris wheel comprising at least one column, a shaft supported at one end of said column for rotation about its axis, means mounting said column for pivotal movement about a horizontal axis, a spoke supporting wheel hub member mounted on the shaft including a fixed portion and at least one other portion pivoted on the fixed portion about an axis parallel to the shaft, wheel spokes pivoted at one end to the hub portions about axes parallel to the shaft, means for releasably maintaining the portions about the shaft, and means for releasably engaging said column for maintaining it in upright position with the shaft on the upper end thereof, whereby upon release of the maintaining and engaging means the column and spokes can be moved to a substantially horizontal position.

13. A Ferris wheel as defined in claim 12 including a mobile base for supporting the column mounting means, and means on said base spaced from the pivotal mounting axis of the column for supporting it in substantially horizontal position.

14. A Ferris wheel as defined in claim 13 including a further means mounted on the base for supporting the spokes adjacent their free ends.

15. A Ferris wheel as defined in claim 12 including a winch and cable mounted on the base, said cable being engageable with the column for moving it to an upright position about its pivotal mounting.

16. A foldable Ferris wheel comprising, a mobile base, a pair of spaced columns, means mounted on the base for supporting the columns, a rotatable shaft extending between the upper ends of the column, a foldable wheel hub assembly mounted on the shaft adjacent each of the columns, each wheel hub assembly comprising a hub section fixed to the shaft and a plurality of movable hub sections pivotally mounted to the fixed hub section foldable about the shaft to form with the fixed hub section a substantially continuous wheel hub fixed to the shaft, a plurality of spokes pivotally mounted at their inner ends to the hub sections, and means for releasably maintaining the hub sections about the shaft.

17. A foldable Ferris wheel as defined in claim 16, including means pivotally mounting said columns to the supporting means for movement about a horizontal axis.

18. A foldable Ferris wheel as defined in claim 17, including means mounted on the base and engageable with the columns for moving them about their pivotal mounting means to position them in upright position with the shaft in the uppermost position and for controlling movement of the columns to a horizontal position.

References Cited in the file of this patent
UNITED STATES PATENTS 2,590,934     Catlett _____ Apr. 1, 1952
2,847,216     Courtney _____ Aug. 12, 1958